E. H. VITTECOQ.
Mill Bolt.
No. 45,802.
Patented Jan'y 3, 1865.
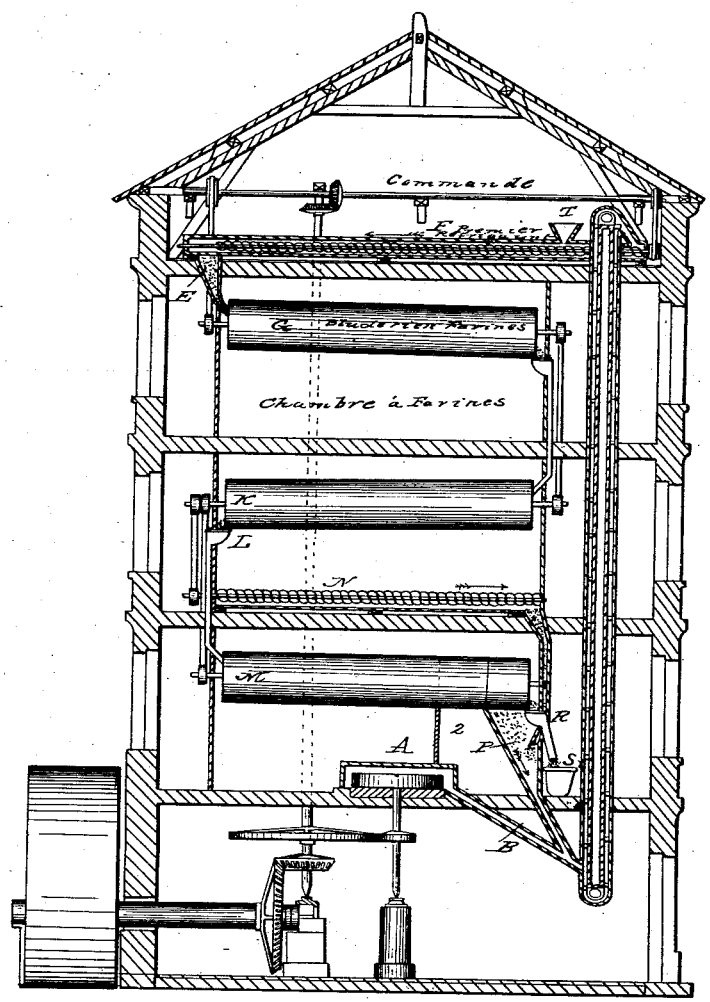

UNITED STATES PATENT OFFICE.

EDOUARD HONORÉ VITTECOQ, OF BEAUMONTEL, FRANCE.

IMPROVEMENT IN BOLTING-MILLS.

Specification forming part of Letters Patent No. 45,802, dated January 3, 1865.

*To all whom it may concern:*

Be it known that I, EDOUARD HONORÉ VITTECOQ, of Beaumontel, in the Empire of France, have invented certain new and useful Improvements in Bolting-Mills; and I hereby declare that the following is a full, clear, and exact description of the same, reference being had to the accompanying drawing.

Hitherto in mills for bolting flour and meal it has been customary to fit tappets in the interior or beaters or other appliances on the exterior, of the bolting or sifting apparatuses in order to accelerate the bolting; but the repeated blows of these appliances against the bolting-cloth often form holes therein; the sifted flour is, besides, of an inferior quality, and becomes formed into lumps, and in order to prevent the meshes of the bolting-cloths getting clogged, it has been necessary to employ cloths with coarse meshes, to the detriment of the flour.

Now, this invention consists in introducing and causing to circulate freely in the bolting-mill coarse bran and crushed grain with the meal or flour, in such manner that the meal or flour is cooled and prevented from becoming attached to and clogging the meshes of the bolting-cloths. I am thus enabled to employ cloths with very fine meshes, whereby the flour is more perfectly sifted, and by dispensing with tappets, beaters, and similar appliances I avoid the injury to the bolting-cloths which they have hitherto caused.

I lead the bran and coarse flour from the last bolting or sifting apparatus through a channel or pipe to the bottom of an endless chain, carrying cups or buckets. Another channel or pipe also leads the crushed grain from the mill-stones to the bottom of the endless chain. The endless chain delivers the bran, coarse flour, and crushed grain at top to an Archimedean screw, in which they become cooled. The screw is surmounted by a hopper, by which bran or crushed or uncrushed grain may be supplied to the screw in any required quantities. The screw delivers the bran, flour, and grain through a pipe or channel to a first bolting or sifting apparatus, which bolts or sifts the finer flour or meal, while the coarse flour and bran pass on through a pipe or channel to a second bolter or sifter. This second bolter or sifter bolts or sifts the finer of the remaining flour, which falls onto a second Archimedean screw and becomes cooled, falling at the farther end of the screw through a pipe or channel into the pipe or channel first hereinbefore mentioned, which leads to the endless chain of cups. The coarsest flour and bran may then pass on to the last bolter or sifter, in which the pollen and lumps become separated, and are delivered to suitable receptacles.

I do not limit myself to the employment of three bolting or sifting apparatuses, as more or less may be employed as considered desirable.

The accompanying drawing represents a bolting-mill constructed according to my invention with three bolting apparatuses.

I lead the bran and coarse flour from the last bolting apparatus M, through a channel or pipe, P, to the bottom of an endless chain, C, carrying cups or buckets. Another channel or pipe, B, leads the crushed grain from the mill-stones A, also to the bottom of the endless chain C. The chain C delivers the bran, coarse flour, and crushed grain at top to an Archimedean screw, F, in which they become cooled. The screw F is surmounted by a hopper, T, by which bran or crushed or uncrushed grain is supplied to the screw. The screw F delivers the bran, flour, and grain through a pipe or channel, E, to a first bolting or sifting apparatus, G, which bolts or sifts the finer flour or meal into the chamber O, while the coarse flour and bran pass on through the pipe or channel I to a second bolter or sifter, K. This bolter sifts the finer of the remaining flour, which falls onto a second Archimedean screw, N, and becomes cooled, falling at the farther end of the screw through a channel or pipe into the channel P, which leads to the endless chain of cups C. The coarsest flour and bran pass on from the bolter K to the third bolter M, by which the pollen is bolted into the compartment Q, while the lumps pass out at the end of the bolter, and are received in a receptacle, S. By means of the bran or grain introduced into the mill by the hopper T the flour or meal is finely divided, and at the same time cooled, while the friction of the bran or grain against the bolting-cloths prevents the meshes becoming clogged.

Having now described the nature of the said invention and in what manner the same is to be performed, I declare that I do not limit myself to the employment of a hopper for introducing the bran or grain into the bolting-mill, or of Archimedean screws for conveying the flour, bran, and grain, as other appliances may be conveniently adopted, and that I claim—

The construction and arrangement of bolting-mills, substantially as set forth, for operation in the manner and for the purpose described.

In testimony whereof I have signed my name to this specification before two subscribing witnesses.

E. H. VITTECOQ.

Witnesses:
CH. ARMENGUAD,
E. SHERMAN GOULD.